United States Patent [19]

Blommers et al.

[11] 4,032,515
[45] June 28, 1977

[54] CURABLE RESORCINOL TERMINATED UREA-FORMALDEHYDE RESINS

[75] Inventors: Elizabeth A. Blommers, Monroeville; Roy H. Moult, Murrysville, both of Pa.

[73] Assignee: Koppers Company, Inc., Pittsburgh, Pa.

[22] Filed: July 24, 1975

[21] Appl. No.: 598,728

Related U.S. Application Data

[63] Continuation-in-part of Ser. No. 520,784, Nov. 4, 1974, abandoned, which is a continuation of Ser. No. 304,113, Nov. 6, 1972, abandoned.

[52] U.S. Cl. .............................. 260/70 R; 260/17.2; 260/29.3; 260/29.4 R; 260/51.5; 260/69 R; 260/840

[51] Int. Cl.² .................. C08G 14/08; C08G 12/12; C08G 12/40

[58] Field of Search ............. 260/51.5, 69 R, 70 R, 260/70 A, 17.2, 29.3, 29.4, 840

[56] References Cited

UNITED STATES PATENTS

| | | | |
|---|---|---|---|
| 2,437,710 | 3/1948 | Rhodes | 260/51.5 X |
| 2,500,543 | 3/1950 | Anthony et al. | 260/51.5 X |
| 3,076,772 | 2/1963 | Christ | 260/17.2 |
| 3,336,246 | 8/1967 | Golick et al. | 260/51.5 X |
| 3,429,770 | 2/1969 | Ayers | 260/29.3 X |
| 3,492,263 | 1/1970 | Kreibich et al. | 260/29.3 X |
| 3,547,868 | 12/1970 | Schwartzenburg et al. | 260/29.3 |
| 3,852,374 | 12/1974 | Erdmann et al. | 260/840 X |

FOREIGN PATENTS OR APPLICATIONS

1,102,394  3/1961  Germany ..................... 260/51.5

OTHER PUBLICATIONS

Walker, J. Frederic, Formaldehyde (3rd Ed.) ACS Monograph Series No. 159, Reinhold Pub. Co. N.Y., 1964, pp. 382–384 & 637–638.

*Primary Examiner*—Lucille M. Phynes
*Attorney, Agent, or Firm*—Robert D. Yeager; Olin E. Williams

[57] ABSTRACT

A urea-formaldehyde resin based adhesive that is resistant to heat and hydrolysis and hence is useful for exterior use in plywood and laminated timbers consists of a resorcinol terminated urea-formaldehyde resin having the general formula:

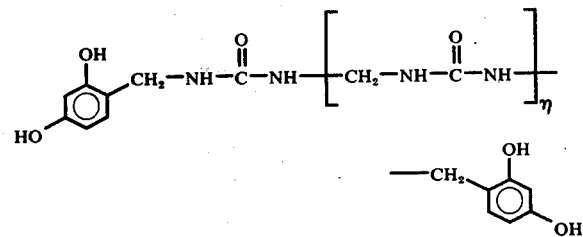

where $\eta = 0$ to 10, that is cured by conventional hardeners under neutral or alkaline conditions.

6 Claims, No Drawings

CURABLE RESORCINOL TERMINATED UREA-FORMALDEHYDE RESINS

CROSS REFERENCE TO RELATED APPLICATIONS

This is a continuation-in-part of U.S. application Ser. No. 520,784, filed Nov. 4, 1974, which is a continuation of U.S. application Ser. No. 304,113, filed Nov. 6, 1972, both of which are now abandoned.

BACKGROUND OF THE INVENTION

1. Field of the Invention

The present invention relates to high durability adhesives having for their basis stable resorcinol-terminated urea-formaldehyde resins that are cured under neutral or alkaline conditions with an aldehyde curing agent and are suitable for use in exterior wood products.

2. Description of the Prior Art

It is well known that urea-formaldehyde resins may be advantageously used in forming adhesive compounds; one important advantage of urea resins is relatively low cost. However, the urea resin adhesives are strictly limited to applications in which moisture or high temperatures are not prresent (as they would be in exterior use). The reason for this limitation is that urea-formaldehyde resins are normally cured with an acid catalyst and this curing reaction is reversible in the presence of moisture or heat, i.e. hydrolysis occurs. Thus, the urea-formaldehyde adhesives traditionally have been restricted to interior applications where the adhesive is not exposed to water, humidity, steam, excessive temperatures and the like. The restriction of urea-formaldehyde adhesives to interior use has meant that much higher cost adhesive materials, such as resorcinol resins, must be used in exterior applications.

Resorcinol adhesive resins exhibit high durability or water resistance due to extensive cross-linking of their molecules upon curing. Curing of resorcinol resins, moreover, is accomplished under either neutral or alkaline conditions by reacting the resin with a methylene donor such as paraformaldehyde to cross-link the resorcinol. While urea-formaldehyde resins exhibit stability under neutral or alkaline conditions (i.e., stable against hydrolysis), cross-linking of those resins cannot be effected by the mere addition under neutral or alkaline conditions of a methylene donor because the only result of that procedure is an increase in the chain length of the urea-formaldehyde molecule; and curing of urea-formaldehyde resins under acid conditions results, as aforesaid, in cured resins that are hydrolyzable in the presence of acid conditions or hot water.

Conditions that heretofore have been employed in which a urea-formaldehyde and resorcinol are used together have been such as to break down the urea-formaldehyde usefully to provide the resorcinol with a formaldehyde donor as in Rhodes U.S. Pat. No. 2,437,710 wherein, in those instances in which a urea based donor is employed, either high temperatures, (those at least as high as either that at which resorcinol is molten or reflux temperatures of between 70° and 100° C) or a decomposing acidic catalyst (oxalic acid) is used. Or in another instance, in Golick et al. U.S. Pat. No. 3,336,246, the resorcinol is employed to form a complex with a protein starch and the urea resin to produce a glue that will rapidly bond thin laminates such as paper board and demonstrate an improved water resistance under the limited conditions under which paper can be used. Thus in none of the foregoing were true resorcinol condensates formed as for example in German Auslegeschrift No. 1102394 and in that publication there is of course no teaching of the neutral or alkaline curing to form urea-formaldehyde based adhesives. It is, indeed, reflective of technical sensitivity of adhesives in this field that phenol formaldehyde adhesives are far from equivalent to resorcinol formaldehyde adhesives, the former while cheaper being entirely unsatisfactory for many of the purposes (e.g. exterior plywood made by normal gluing procedures) for which the resorcinol resin is well suited.

The primary object of this invention is therefore the preparation of an adhesive that is stable in the presence of moisture and heat and therefore is suitable for exterior uses and which nevertheless uses as a base or "backbone resin" the relatively inexpensive urea-formaldehyde resin as compared to the more expensive resorcinol formaldehyde resin which solely could be used for such purposes heretofore.

Another object of the invention is to provide a stable exterior grade adhesive that is based upon a urea-formaldehyde resin and that consequently (as do such urea-formaldehyde resins) has in addition to being economical the advantages of being curable by the radio frequency, (and hence deeply penetrating) method of heating and blend suitably with such fillers as walnut flour as has heretofore been suggested, cf. Ayers U.S. Pat. No. 3,429,770 for the typical resins interior-grade use of urea-formaldehyde resins.

SUMMARY OF THE INVENTION

The present invention provides high strength, high durability adhesives that consist of resorcinol-terminated urea-formaldehyde resins which are cured under neutral or alkaline conditions with an aldehyde curing agent. Unlike conventional urea-formaldehyde adhesives, the resins of the present invention comprise a high urea to formaldehyde ratio. Adhesives of the present invention are water resistant and capable of radio frequency curing techniques.

Generally, the method for preparing the resins of the present invention comprises first synthesizing a urea-formaldehyde polymer having the following general formula:

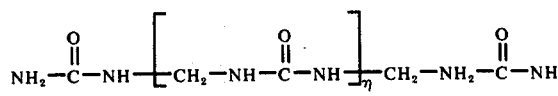

where $\eta$ is preferably selected so as to provide a solubilizable polymer, for example $\eta = 0$ to 10. Commercially available urea-formaldehyde polymers are also suitable for use in the present invention, and it is preferable that they be prepared from monomers that have a ratio of urea to formaldehyde of about 1 to 2. It is clear, however, that urea-formaldehyde resins having a ratio, for example, of 1 to 1 may also be used. It is known that the synthesis of the basic unit of these resins, dimethylol urea, is accomplished at a pH of about 8. The subsequent polymerization of dimethylol urea is performed conventionally in the presence of an acid catalyst and thus at a pH of about 3 to 4 since methylene bridges are formed only under acidic conditions. The length of the resulting polymer chain is governed inversely by the concentration of available formaldehyde.

The urea-formaldehyde resin is then terminated with methylol groups under slightly alkaline conditions (pH of about 8) to provide a polymer of the general formula:

As hereinafter described this polymer may be solubilized by the addition of sulfite groups in place of some of the hydroxyl groups. With the use of an acid catalyst, the polymer is terminated with resorcinol at a pH no greater than 4 and preferably between 1 and 2, and importantly at a temperature at most about 50° C, to provide a resorcinol terminated urea-formaldehyde resin of the following general formula:

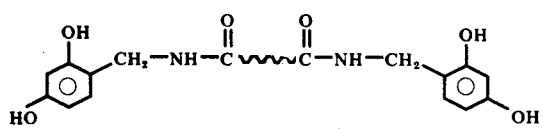

The term resorcinol terminated urea-formaldehyde is used herein to include not only resins having the above general formula but those of the general formula in which minor amounts of resorcinol are incorporated into the molecular chain, as, for example, when short urea-formaldehyde chains are terminated with resorcinol which then may join together. Minor amount is herein defined so as to exclude that amount of resorcinol incorporation which by itself affects the ability of the resin to cure under either neutral or alkaline pH conditions with an aldehyde curing agent. To ensure an especially high durability, molar ratios of resorcinol to urea of greater than 0.5 to 1 are used.

The resorcinol terminated urea-formaldehyde resin is curable, for example, with paraformaldehyde under either neutral or alkaline conditions. In the formulation of adhesives, fillers or extenders such as walnut shell flour, wood flour, and the like are blended with the paraformaldehyde. In the preparation of the adhesive for use in bonding wood, the resin is pre-mixed with water and with preferably slight amounts of ethyl alcohol having methyl ethyl ketone therein. This mixture is then mixed with the hardener blend prior to application.

Since the urea-formaldehyde resorcinol polymeric resins are only slightly soluble in water, it is preferable, in order to prepare an inexpensive adhesive, to water solubilize the resins. It has been found that by sulfonating the methylolated urea-formaldehyde polymer and stopping the sulfonation reaction at an alkaline pH, the polymeric resins resulting from the subsequent addition of terminal resorcinol are rendered more soluble in water. Thus, with sulfonation according to the present invention, organic solvents are not generally needed for solubilization of the resin. For example, a resorcinol-/urea-formaldehyde resin of 62/38 mole percent can be made water soluble at 60% solids.

The foregoing synthesis up to and including the preparation of the sulfite modified resins can be performed in a single kettle to substantially reduce the cost of prepared adhesives. In the preparation of the resorcinol terminated resins, an acid catalyst may be used; the reaction proceeds smoothly at room temperature to provide a stable resin. A suitable acid catalyst is p-toluene sulfonic acid.

In the preparation of adhesives with the resins of the present invention, wood cellulose, wood flour, walnut shell flour and the like can be incorporated at the same time as the addition of paraformaldehyde used to cure the resin. These additives impart reinforcing properties to the cured exterior adhesive of the present invention in the same manner as taught in Ayers U.S. Pat. No. 3,429,770 for the extension of the typical urea-formaldehyde resins used for the production of interior grade plywood.

To lower the cost of the final adhesive formulation where it is desired to use relatively high resorcinol-urea ratios, it is preferred that resorcinol still residue be utilized in part for the resorcinol. In one such case the resin included by weight 7.6 parts urea; 20.7 parts formaldehyde, 37% (< 1% MeOH); 25.4 parts resorcinol still residue; 30.5 parts resorcinol; 1.2 parts sodium hydroxide, 50% aqueous solution; 0.2 parts concentrated hydrochloric acid; 1.6 parts anhydrous sodium metabisulfite; and 12.8 parts water.

The resin is preferably prepared by charging into a kettle both the urea and formaldehyde and stirring the resultant solution and at the same time maintaning the pH between 9 and 10 with sodium hydroxide. The solution is heated to reflux and maintained at reflux for about 30 minutes. It is then cooled to about 40° C with continued stirring. Resorcinol still residue (2:1) is added and stirred for about one hour. Concentrated hydrochloric acid is added to adjust the pH to between 1 and 2. Because the reaction in the presence of hydrochloric acid is exothermic, it is necessary to cool the solution to about 30° C. After approximately 30 minutes, resorcinol is incrementally added over a period of about 30 minutes. After about 3 hours, the pH is adjusted to between 7.0 and 7.1 with sodium hydroxide. Preferably, during the charging of the urea and formaldehyde, sodium meta-bisulfate is also added to provide a sulfite modified urea-formaldehyde which is water soluble.

The resin prepared by the preferred method includes 69 to 70% solids with a viscosity at 23° C of 3-7 poise.

In the preparation of an adhesive utilizing resorcinol terminated urea-formaldehyde resin, a preferred hardener comprising by weight 55.8 parts walnut shell flour; 6.3 parts wood flour; 34.7 parts paraformaldehyde and 3.2 parts magnesium oxide are blended with the resin. The resulting adhesive provides high strength and durability.

The advantages of the present invention are apparent from the following nonlimiting examples which comprise the preferred embodiments of the invention.

PREFERRED EMBODIMENTS

The strength and durability of adhesives prepared in accordance with the present invention were tested pursuant to the following test procedures:

Bond Strength:

Three ply birch panels were prepared by brushing an adhesive onto the 2 faces and core of 4 × 12 × 1/16 inches birch (12% moisture content), permitting the assembly to remain closed (with minimal pressure) for a designated time, and pressing at 200 psi and 240° F for either 3, 4 or 5 minutes.

After sitting for about 16 to 20 hours at 73° F and 63% relative humidity, the plywood panels were cut into 10 test specimens, according to Commercial Standard CS45-48. Five alternate specimens were broken immediately in a Globe Tester to determine dry strength (psi) and % wood failure (WF%). The other five specimens were tested for durability.

Durability of Adhesives:
1. Boil Test — Commercial Standard CS 35-49
   a. Four hour boil;
   b. Twenty-four hour drying at 63° C;
   c. Four hour boil; and
   d. Specimens broken wet.
2. Vacuum-Pressure-Steam Cycle The following exposure test was used on any bond that appeared satisfactory:
   a. Thirty minute water immersion under a vacuum of 20-25 inches of mercury;
   b. Sixty minute water immersion under a pressure of 70 psig;
   c. Ninety minute exposure to live steam;
   d. Sixteen hour drying in forced draft oven set at 160° F; and
   e. Recycling as in a) to d) for a total of 4 cycles. Then immersion in cool water for at least an hour and broken, wet, on Globe Tester.

Work-Life of Adhesives:

A 100 g. sample of an adhesive was mixed in a Constant Temperature Room (73° F and 65% RH) and the time noted for the mix to reach a highly viscous state.

In testing the resins for their adaptability for use in radio frequency bonding of wood, arcing characteristics were evaluated. An adhesive formulation which exhibited no arcing is preferable, and one in which a nontracking arc is produced is acceptable. However, where a tracking arc is produced, the radio frequency bonding equipment is shorted and the adhesive is deemed unacceptable for such curing techniques.

In many of the following specific examples, dimethylol urea, e.g. Example 1 and 2 or dimethylol methylene cured, e.g. Example 3 and 6, was used as the basis of the urea-formaldehyde component in order that reasonably precise reactant proportions could be established. In the use of methylolated and solubilized urea-formaldehyde resins it is of course not possible to know just what mixture of polymers of differing molecular weight, or monomer units, is present nor consequently how many terminal hydroxyl or sulfite radicals are present for substitution by resorcinol. The economic advantage of the present invention lies in employing as low a proportion of resorcinol to urea in terminating the urea-formaldehyde chain as is consistent with product stability in the presence of acid, water, and high temperature and with good bonding behaviour. The maximum number of urea monomer units in the urea-formaldehyde resin that can be employed in solubilized form in the present invention is eleven (or the maximum 10 of the general formula), and a more readily solubilized UF resin will contain an average of from 5 to 6 units. So prepared or purchased urea-formaldehyde resins have thus been successfully employed to replace 50 percent of the resorcinol which otherwise would be used in a resorcinol-formaldehyde adhesive, the urea polymer having been prepared with a urea-formaldehyde ratio of 1/.9. A stable resin containing only 33 mol percent resorcinol was also prepared but at a sacrifice of bonding strength that indicates this proportion to be the lowest practicable of resorcinol.

EXAMPLE 1

Preparation of Resorcinol-Terminated Urea-Formaldehyde And Adhesive Prepared Therefrom To a 1 liter flask equipped with stirrer, thermometer and condenser were charged 220 g. (2M) resorcinol, 220 g. $H_2O$ and 1.2 g. p-toluene sulfonic acid. The pH was approximately 1. Through an addition funnel was added, slowly, 72 g. (0.6 M) of powdered dimethylol urea. The addition took 2-½ hours during which time the temperature was not allowed to rise above 21° C. After the addition was complete, the reaction solution was stirred at room temperature (25° C) for an hour. The pH was then adjusted to 7.1 with 50% NaOH and the solution poured into an evaporating dish for removal of water overnight in a forced draft oven set at 50° C.

The viscous resin had been concentrated to 89.7% solids. On dilution with water an emulsion formed.

An adhesive mix was prepared by blending 100 parts by weight of resorcinol terminated urea-formaldehyde with 5 parts wood flour filler [Wilner 139] and 11 parts paraformaldehyde at a pH of 8.7. The results of this example are set forth in TABLE I.

EXAMPLE 2

To a 1 liter resin flask equipped with stirrer, thermometer and condenser were charged 110 g. resorcinol (1 M), 55 g. $H_2O$, 41.3 g. methanol, 13.7 g. Solox, (primarily ethyl alcohol with a small amount MEK) and 1 g. of p-toluene sulfonic acid. The pH was about 1. Through an addition funnel was slowly added 72 g. (0.6 M) of powdered dimethylol urea. The addition took 5-½ hours during which time the temperature was not allowed to rise above 22° C. After the addition was complete, the reaction mixture was stirred at room temperature (23° C) for 3/4 of an hour. The pH was then adjusted to 7.9 with 50% NaOH and the solution stored in a quart jar.

The resin solution was at 58% solids. On dilution with water a sticky resin formed.

An adhesive mix was prepared by blending 66.8 parts by weight of the resin with 33.2 parts water, 7.5 parts wood flour filler [BNB-100] and 11 parts paraformaldehyde. The results of the adhesive so prepared are set forth in TABLE I.

TABLE I

EFFECT OF STORAGE ON BONDING PERFORMANCE OF TWO RESORCINOL-TERMINATED UREA-FORMALDEHYDE RESINS

| Adhesive Example No. | Age | pH | Work Life (hr.) | Spread (lb/1000 ft²) | Closed Assembly Time (min.) | Press Time (min.) | Strength (psi-WF %) | Durability (psi-WF %) |
|---|---|---|---|---|---|---|---|---|
| 1 | 1 week at R.T. | 8.7 | 1 | 80 | 15 | 3 | 652-61 | 586-53 |
|   |   |   |   | 73 | 15 | 4 | 728-89 | 640-86 |
|   | 2 months at R.T. | 8.0 | >3<16 | 88 | 15 | 3 | 710-91 | 638-96 |
|   |   |   |   | 80 | 15 | 4 | 636-95 | 528-98 |
| 2 | 4 days at R.T. | 8.0 | >3<16 | 74 | 15 | 3 | 636-100 | 622-92 |
|   |   |   |   | 88 | 15 | 4 | 696-93 | 532-91 |
|   | 1 week at 45° C. | 8.1 | >2<16 | 94 | 15 | 3 | 588-12 | 480-66 |
|   |   |   |   | 80 | 15 | 4 | 734-80 | 598-76 |

EXAMPLE 3

Preparation of Resorcinol-Terminated Dimethylol Methylene Diurea a. Preparation of methylene diurea A 4 liter resin flask equipped with a stirrer and condenser was charged with 1,540 g. urea, 1,540 ml $H_2O$, 22.5 ml. conc. HCl, and 250 g. of 37% formaldehyde. After being stirred well the mixture was allowed to sit at room temperature for 2 days. The mixture was not neutralized to pH 7 with 50% NaOH and the heavy white precipitate collected by filtration. The impure product was dried (925 g. yield) and then extracted with 1500 ml of ethanol. The alcohol-insoluble portion was again dried. The yield of white powder was 471 g. (m.p. > 270° C).

b. Preparation of dimethylol methylene diurea

A 300 ml resin flask equipped with stirrer, thermometer and condenser was charged with 32.4 g. (0.4 m) 37% formaldehyde (< 1% MeOH) and the pH adjusted to 8.5 with 50% NaOH. To this solution was added 26.4 g. (0.2M) of purified methylene diurea over a period of 1-½ hours. The temperature remained at 22°–23° C. but the solution became milky. Three milliters of Solox and 5 ml of $H_2O$ were added. The pH was adjusted to 8 with 50% NaOH and the milky solution allowed to sit at room temperature overnight. The product was now a paste.

c. Preparation of resorcinol-terminated dimethylol methylene diurea Resorcinol/DMMDU — 1/.6

A 300 ml. resin flask equipped with stirrer, thermometer and condenser was charged with 36.7 g. resorcinol (0.33M), 36.7 g. $H_2O$ and 0.5 g. p-toluene sulfonic acid. The pH was around 1. To this solution was slowly added the pasty methylene diurea thinned with 37 ml. Solox. The addition took 2 hours and the temperature was not permitted to go above 32° C. After the addition was complete, the milky solution was stirred at room temperature for ¾ of an hour. The pH was then adjusted to 7 with 50% NaOH and water was removed overnight in a forced draft oven at 45° C.

The highly viscous product had a solids content of 90.5%. The % free resorcinol was 7.27 (by IR).

EXAMPLE 4

Preparation of a Resorcinol-Modified Urea Formaldehyde Chain a. Preparation of urea-formaldehyde resin To a 300 ml. resin flask equipped with stirrer, thermometer and condenser were charged 60 g. urea (1 M) and 56.7 g. (0.7 M) 37% formaldehyde (< 1% MeOH). Heat was applied to raise the temperature to 26° C. and then 10 ml. of $H_2O$ were added. The urea became totally dissolved. At this point 1 drop of 10% $H_2SO_4$ was added to adjust the pH to 3–4. Heat was removed but the temperature rose to 44° C. over a period of 20 minutes. An ice-bath was applied, when needed, to maintain the temperature around 40° C. for another 45 minutes. The milky suspension was finally cooled to room temperature and dried by evaporation at room temperature.

b. Resorcinol modification

To a 300 ml. resin flask equipped with stirrer, thermometer and condenser were charged 25 g. of the resin prepared in (a) and 25 g. of $H_2O$. To this dispersion was added 1 drop of 50% NaOH (pH now 8–9) and 20 ml. of water. A paste was formed to which was added 10 ml. of 37% formaldehyde (pH previously adjusted to 8). This mixture sat at room temperature overnight. The thick paste that resulted was mixed into 22 g. of resorcinol dissolved in 22 g. $H_2O$, pH at 8. Heat was applied and the temperature maintained at 50°–54° C. for 6 hours. During this time the pH was checked to be sure it was in the 7–8 region. At the end of the heating period the emulsion that had formed was cooled to room temperature and stored in a glass jar. After three months at room temperature the emulsion was still intact.

EXAMPLE 5

Preparation of Resorcinol-Terminated Sulfite-Modified U-F Resins a. Sulfite modification To a 1 liter resin flask equipped with stirrer, thermometer and condenser and sampling tube were charged 150 g. urea (2.5 M), 406.2 g. (5.01 M) 37% formaldehyde (< 1% MeOH), 30.6 g. $Na_2S_2O_5$. The pH was adjusted to 9–10 with 10% $Na_2CO_3$. The reaction mixture was heated to reflux and held there for 30 minutes. It was then cooled to 53° C. and 50% formic acid added until a pH of 4 was reached. Condensation was continued until a viscosity of H (Gardner scale) was reached. At this point the reaction mixture (an emulsion) was cooled to room temperature and the pH was adjusted to 7–8 with 50% NaOH.

b. Resorcinol termination

To a 300 ml resin flask equipped with stirrer, thermometer and condenser were charged 55 g. resorcinol (0.5 M), 55 g. $H_2O$ and 1.0 g. p-toluene sulfonic acid. To this solution 100 g. U-F polymer from step (a) (approx. 53% solids) was slowly added over 2 hours with the temperature maintained at 19°–21° C. When half the U-F resin had been added, a precipitate formed. When the addition was complete, a great deal of resin was present which would not dissolve at pH 8. When the mixture was dried overnight in a forced draft oven set at 50° C., a white solid remained which was soluble in 50% dioxane at 60% solids.

EXAMPLE 6

Preparation of Resorcinol-Terminated Sulfite-Modified Dimethylol Methylene Diurea a. Sulfite modification of methylene diurea To a 1 liter resin flask equipped with stirrer, thermometer and condenser were charged 132 g. (1 M) of purified methylene diurea, 162.2 g. (2 M) of 37% formaldehyde (< 1% MeOH), enough 50% NaOH to adjust pH to 9 and 12.24 g. sodium metabisulfite. The pasty blend was stirred while heat was applied. In 2-½ hours the temperature had risen to 69° C. but the mixture was still pasty. Sixty milliliters of $H_2O$ were now added and heating was increased. In another hour the mixture was at 97° C. and practically a clear solution. Heating was continued for another 20 minutes. The solution was then allowed to cool to room temperature In 1-½ hours the milky solution was at 35° C with a pH 6–7. The pH was adjusted to 8 with 1 drop of 50% NaOH and allowed to sit overnight. The paste that was now present was turned into a cream through the addition of 20 ml of $H_2O$.

b. Resorcinol termination at 1/.3

To a 1 liter resin flask equipped with stirrer, condenser and thermometer were charged 110 g. (1 M) resorcinol, 110 g. of $H_2O$ and 1 g. of p-toluene sulfonic acid. With the temperature kept between 15°–20° C, 116.1 g. (0.3 M) of dimethylol methylene diurea polymer of step (a) was slowly added over 3 hours. When the addition was complete, the hazy solution was stirred at room temperature for ¾ of an hour. The pH was now adjusted to 7 and the product poured into an evaporating dish for drying overnight in a forced draft oven set at 50° C.

The moderately viscous resin had a solids content of 90.5%. On dilution with water a haze formed.

The % free resorcinol (dry) was 33.5% (by IR).

c. Resorcinol termination at 1/.6

The same procedure described in (b) was followed except that 232.2 g. (0.6 M) of step (a) dimethylol methylene diurea polymer was added.

The viscous resin that remained after drying had a solids content of 67.4%. On dilution with water an emulsion formed.

The % free resorcinol (dry) was 13.3% (by IR).

EXAMPLE 7

Single-Kettle Preparation of Resorcinol Terminated Urea Formaldehyde Resins

A. Sulfite Modification

To a 1 liter resin flask equipped with stirrer, thermometer and condenser were charged 150 g. urea (2.5 m), 406.2 g. (5.01 m) 37% formaldehyde (< 1% MeOH), 30.6 g. $Na_2S_2O_5$. The pH was adjusted to 9-10 with 50% NaOH. The reaction mixture was heated to reflux and held here for 30 minutes. Upon cooling to room temperature it became milky, with some precipitation.

B. Base Catalysis of 62 Mole Percent Resorcinol

To a 300 ml resin flask equipped with stirrer, thermometer and condenser were added 55 g. resorcinol and 40 g. water. To this solution, now adjusted to pH 8 with 50% NaOH, was added 70.75 g. of well-stirred sulfite modified dimethylol urea prepared in part A. Heat was applied and the temperature rose to 55° C. A temperature of 50°-56° C. was now maintained for a period of 6 hours, during which time frequent addition of 50% NaOH was made to keep the pH at 8.

A sample of the reddish solution (at 53% solids and a pH of 7.7) was placed in a 45° C. stability test oven. In 1 day a gel formed.

C. Acid Catalysis of 62 Mole Percent Resorcinol

To a 2 liter resin flask equipped with stirrer, thermometer and condenser were charged 150.0 g. urea (2.5 m) and 406.2 g. 37% formaldehyde (5.0 m). After adjustment to pH 8 with 6 drops of 50% NaOH the solution was mixed with 30.0 g. of $Na_2S_2O_5$. Adjustment to pH 9-10 was made with 2 drops of 50% NaOH.

Heat was applied to raise the temperature to 98° C. and refluxing was maintained for 30 minutes. Heat was removed and the solution was allowed to cool to 61° C. At this point 100 ml of water was added and a cooling bath applied to drop the temperature to 42° C. When 458.4 g. of resorcinol (4.2 m) was added, the temperature dropped to 19° C. Upon the addition of 4.5 g. of p-toluene sulfonic acid, the temperature began to rise. Over a period of 5 hours the temperature was not allowed to go above 39° C., with the principal range being 28°-33° C. Adjustment of the pH from 1-2 to 7.2 was now made with 50% NaOH.

A sample of this reddish solution (62.2% solids) was placed in a 45° C. stability test oven. In 5 days the viscosity changed from 2.8 seconds to 7.5 seconds.

The percent free resorcinol, on a dry basis, was 17.3% (by IR).

D. Acid Catalysis of 64.5 Mole Percent Resorcinol

Example 7D was prepared as in Example 7C except that 500 g. of resorcinol (4.5 m) were used, along with 5.0 g. p-toluene sulfonic acid.

The final pH was 7.4.

A samle of the reddish solution (62.9% solids) was placed in a 45° C stability oven. In 30 days the viscosity changed from 2.7 seconds to 6.2 seconds.

The percent free resorcinol (dry) was 19% (by IR).

E. Acid Catalysis of 66.7 Mole Percent Resorcinol

Example 7E was prepared as in Example 7D except that 100 ml of water, 550 g. resorcinol (5 m), and 5.5 g. of p-toluene solfonic acid were used.

The final pH was 7.4.

A sample of this reddish solution (62.2% solids) was placed in a 45° C stability test oven. In 30 days the viscosity changed from 1.5 seconds to 1.9 seconds.

The precent free resorcinol (dry) was 22% (by IR).

See TABLE II for adhesives prepared from this resin. This table demonstrates also that care must be employed particularly to avoid the use of excess water or too high a pH, if the resultant adhesive is to be R.F. cured.

F. Acid Catalysis of 71.4 Mole Percent Resorcinol

To a 2 liter resin flask equipped with stirrer, thermometer and condenser were charged 150 g. urea, 406.2 g. 37% formaldehyde and (< 1% MeOH) 6 drops of 50% NaOH. (Vigorous stirring was maintained throughout the preparation). To this mixture, at pH 8-9 was added 30.6 g. sodium metabisulfite and 2 drops of 50% NaOH. The mixture was now at a pH of 9-10. Heat was applied to bring the mixture to reflux. A temperature of 98°-100° C was maintained for 30 minutes after which time the solution was cooled to 35°-40° C (1 hour). 30.0 g. of water and 684.8 g. resorcinol were now added. The temperature was lowered to about 11° C. and then slowly increased to 15° C. (20-30 minutes). At this point 3.3 g. of toluene sulfonic acid were added. A mild exotherm carried the temperature to 18° C. (in 10 minutes). Another 3.3 g. of acid were added (pH 1-2), with an ice bath used to maintain the reaction temperature below 26° C. For an additional 4-½ hours the reaction mixture was kept between 20°-26° C. At this point 9.2 g. of 50% NaOH were used to adjust the pH to 7.1.

The product was a clear red solution with a solids content of 60% (Abderhalden). The % free resorcinol (on a dry basis) was 27.5% (by IR).

| Stability | Secs. at 23° C. |
|---|---|
| Initial Viscosity | 0.9 |
| Viscosity after 45 days at 45° C. | 1.0 |

See TABLE II for adhesives prepared from this resin.

G. Acid Catalysis of 76.9 Mole Percent Resorcinol

Example 7G was prepared as in Example 7F except that 300 ml of water, 916.7 g. of resorcinol (8.3 m) and 9 g. of p-toluene sulfonic acid were used.

Final pH was 7.1.

A sample of this reddish solution (64.5% solids), upon storage for 30 days in a 45° C. stability oven, changed in viscosity from 1.0 seconds to 1.1 seconds.

The percent free resorcinol (dry) was 34.8% (by IR).

See TABLE II for adhesives prepared from this resin.

TABLE II

BONDING PERFORMANCE AND ARCING PROPERTIES OF SEVERAL FORMULATIONS OF RESORCINOL-AMINO RESINS

| Resin | R/U (Mole %) | Adhesive Mix (See Table IIA) | Arc Test | Glue Spread[a] (lb/1000 ft²) | Press Time (min.) | Strength (Psi-WF %) | Durability (Psi-WF %) |
|---|---|---|---|---|---|---|---|
| 7G | 76.9/23.1 | AA | Non-tracking (to 6.5 amps) | 87 | 4 | 650-93 | 690-97 |
|  |  |  |  | 90 | 5 | 650-95 | 646-90 |
| 7F | 71.4/28.6 | BB | Non-tracking | 90 | 3 | 632-29 | 630-78 |
|  |  |  |  | 80 | 4 | 624-83 | 718-92 |
| 7F | 71.4/28.6 | CC | Non-tracking (to 6.5 amps) | 93 | 4 | 596-42 | 644-100 |
|  |  |  |  | 93 | 5 | 662-53 | 700-97 |
| 7F | 71.4/28.6 | DD | Tracking | 83 | 4 | 752-64 | 548-40 |
|  |  |  |  | 83 | 5 | 7-100 | 562-92 |
| 7F | 71.4/28.6 | EE | Not Done | 83 | 3 | 754-74 | 698-67 |
|  |  |  |  | 87 | 4 | 704-97 | 724-97 |
| 7F | 71.4/28.6 | FF | Tracking | 73 | 3 | 509-73 | 534-45 |
|  |  |  |  | 80 | 4 | 506-44 | 446-59 |
| 7E | 66.7/33.3 | GG | Tracking | 77 | 3 | 636-99 | 580-92 |
|  |  |  |  | 80 | 4 | 718-92 | 648-95 |
| 7E | 66.7/33.3 | HH | Tracking | 66 | 3 | 572-83 | 418-14 |
|  |  |  |  | 80 | 4 | 662-86 | 568-51 |

[a]Fifteen minute closed assembly.

TABLE IIA

MIX COMPOSITIONS - PARTS BY WEIGHT

| Ingredients | AA | BB | CC | DD | EE | FF | GG | HH |
|---|---|---|---|---|---|---|---|---|
| 7G | 100 |  |  |  |  |  |  |  |
| 7F |  | 100 | 100 | 91.6 |  |  |  |  |
| 7F |  |  |  |  | 100 | 100 |  |  |
| 7E |  |  |  |  |  |  | 96.5 | 96.5 |
| H₂O |  |  |  | 8.4 |  |  | 3.5 | 3.5 |
| Wood Cellulose [BNB-100] | 8.0 | 7.4 | 7.4 |  | 7.4 |  |  |  |
| Walnut Shell Flour [Glufil] |  |  |  | 18 |  | 14 | 13.5 | 13.5 |
| Paraformaldehyde | 11 | 11 | 11 | 11 | 11 | 11 | 11 | 9 |
| pH | 6.7 | 7.3 | 6.6 | 7.1 | 7.2 | 7.2 | 7.3 | 7.2 |

EXAMPLE 8 A-D

Example 7F was repeated in a 15 gallon kettle for examples 8A through 8D, the resin so obtained was blended with various hardeners to formulate adhesives.

In Example 8A, 100 parts by weight of Example 7F resin was mixed with 6.8 parts wood cellulose [BNB-100] and 11 parts para formaldehyde. The pH of the mix was 7.4.

In Example 8B, Example 8A was repeated, but with a pH of 7.1.

In Example 8C, 100 parts by weight of Example 7F resin was mixed with 7-9 parts wood flour [Wilner 179] with a mix pH of 7.4.

In Example 8D, Example 8C was repeated, but the pH was maintained at 7.1.

The prepared adhesive mixes were tested and the results summarized in TABLE III.

EXAMPLE 9 A-H

Resins Incorporating Resorcinol Still Residue

In Examples 9A through 9H, resins were prepared using various batches of resorcinol still residue. Synthesis for all of the resins was the same and is set forth below.

Synthesis with resorcinol still residue:

To a 4 liter resin flask equipped with stirrer, thermometer and condenser were charged 300.0 g. urea, 812.4 g. of 37% formaldehyde and 9 drops of 50% NaOH. To this mixture, at pH 8-9 was now added 61.2 g. of sodium metabisulfite and 2 drops of 50% NaOH. The mixture was not at a pH of 9-10. Heat was applied to bring the mixture to reflux. A temperature of 90°-100° C. was maintained for 30 minutes after which time the solution was cooled to 35°-40° C. (1 hour).

To this solution was added 1000 g. of resorcinol still residue (any batch) dissolved in 500 g. of water. Stirring at 25°-30° C. was continued for 1 hour. Then 8.0 ml of conc. HCl was added to adjust pH to 1-2. Within 15 minutes the temperature rose from 25° C. to 30° C. An ice bath was applied to keep the temperature between 26°-30° C. After a total time of 30 minutes reaction mixture became hazy and viscous. At this point 100 g. of resorcinol was added. Another 100 g. of resorcinol was added within 15 minutes to clear up the newly-formed haze. Finally, after an additional 20 minutes had passed at 25°-30° C. and another haze had formed, 1000 g. of resorcinol was added. The reaction now ran at 25°-30° C. for 3 hours, at which point 40-45 g. of 50% NaOH was added to adjust pH to 7.0-7.1.

The filtered solution had % solids and stability determinations made on it.

TABLE III

EVALUATION OF 15-GALLON KETTLE BATCH

| Test No. | Arc Test[b] | Glue Viscosity (Poises)[b] | Work Life (Hours) | Spread (lb/1000 ft²) | Press[c] Time (min.) | Strength (Psi-WF %) | Durability (Psi-WF %) |
|---|---|---|---|---|---|---|---|
| 8A | Non-tracking (to 5.0 amps) | 44 | 2-3 | 84 | 3 | 674-95 | 652-82 |
|  |  |  |  | 80 | 4 | 640-78 | 706-81 |
|  |  |  |  | 73 | 5 | 658-61 | 720-76 |
| 8B | Non-tracking (to 6.5 amps)[a] | 41 | 3-4 | 87 | 3 | 648-52 | 656-74 |
|  |  |  |  | 87 | 4 | 698-97 | 584-88 |
| 8C | Non-tracking (to 5.0 amps) | 27 | 3-4 | 93 | 3 | 588-7 | 596-15 |
|  |  |  |  | 84 | 4 | 642-65 | 676-52 |
|  |  |  |  | 80 | 5 | 656-11 | 674-45 |
| 8D | Non-tracking (to 6.0 amps) | 27 | 4-5 | 87 | 3 | 654-74 | 712-80 |
|  |  |  |  | 87 | 4 | 674-20 | 632-27 |
|  |  |  |  | 84 | 5 | 740-79 | 766-84 |

[a]Tracking arc at 5.5-6.0.
[b]Poises measured at 23° C. and 20 RPM.
[c]Closed assembly time of 15 min.

85.7 parts of resins so prepared were blended with 6.6 parts of water. 7.7 parts of Solox and 31.7 parts of hardener which comprised 55.8 parts by weight walnut shell flour [Glufil], 6.3 parts wood flour [Wilner 179] 34.7 parts para formaldehyde, and 3.2 parts magnesium oxide. The results of tests run with adhesives so prepared are set forth in TABLE IV.

TABLE IV

| COMPARISON OF RESINS MADE FROM SEVERAL BATCHES OF RESORCINOL STILL RESIDUE | | | | | | | | | |
|---|---|---|---|---|---|---|---|---|---|
| | | | Stability at 45° C. | | | | Hot Press Bonding Performance | | |
| Free Resorcinol in Batch of Resorcinol Still Residue % | Solids %* | Free Resorcinol %* | (Poises at 23° C. After Storage for Days) | | | | Press Time (Min.) | Strength (Psi-WF %) | Durability (Psi-WF %) |
| | | | 0 | 10 | 15 | 30 | | | |
| 3.4 | 70.4 | 23 | 4.4 | 6.2 | — | 6.2 | 1 | 576–23 | 592–89 |
| | | | | | | | 2 | 584–8 | 556–34 |
| 0.6 | 69.5 | 22 | 4.5 | — | 6.5 | 7.1 | 1 | 588–51 | 664–92 |
| | | | | | | | 2 | 624–46 | 600–20 |
| 18.0 | 69.4 | 28 | 3.6 | — | — | 3.6 | 1 | 538–20 | 688–43 |
| | | | | | | | 2 | 646–60 | 708–56 |
| 3.6 | 69.4 | 25 | 4.5 | — | 5.4 | 5.9 | 1 | 548–49 | 540–15 |
| | | | | | | | 2 | 548–53 | 676–47 |
| 4.3 | 69.1 | 26 | 5.5 | — | 6.0 | 5.9 | 1 | 592–65 | 632–57 |
| | | | | | | | 2 | 556–16 | 588–30 |
| 0.5 | 69.3 | 24 | 4.6 | 6.7 | — | 7.0 | 1 | 610–51 | 620–38 |
| | | | | | | | 2 | 552–33 | 560–21 |
| 13.0 | 69.2 | 27 | 3.6 | 4.6 | — | 4.6 | 1 | 628–36 | 596–40 |
| | | | | | | | 2 | 564–37 | 544–39 |
| 9.0 | 69.5 | 27 | 3.7 | 4.7 | — | 4.6 | 1 | 608–51 | 640–60 |
| | | | | | | | 2 | 604–73 | 680–81 |

*Abderhalden
*By IR

What is claimed is:

1. An adhesive comprising a resorcinol terminated urea-formaldehyde resin having the general formula:

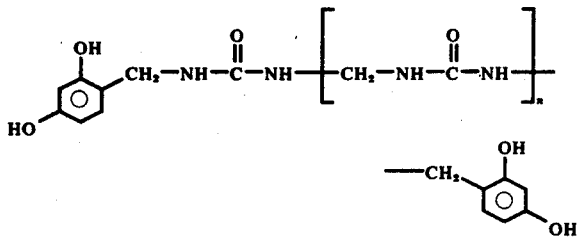

where η = 0 to 10, said resin being cured under neutral or alkaline conditions by reacting it with a formaldehyde.

2. An adhesive as set forth in claim 1 wherein said resin is a sulfite-modified resorcinol terminated urea-formaldehyde.

3. An adhesive as set forth in claim 1 wherein said formaldehyde is paraformaldehyde.

4. In a forming for formina an adhesive composition in which a compound of urea and formaldehyde is formed to a pH of about 8 and is polymerized to form a urea-formaldehyde resin under acid conditions of pH between about 3 and 4, the steps comprising:
   forming terminal methylol groups on the said resin under alkaline conditions, substituting terminal resorcinol groups for the hydroxyl radicals at a temperature of at most about 50° C and at a pH no greater than 4, and cross-linking the so-formed resorcinol-terminated urea-formaldehyde resin at a pH of at least 7.

5. The method of claim 4 in which the terminal resorcinol is added in a molar ratio to the originally employed urea of greater than 0.5 to 1.

6. The method of claim 4 in which the urea-formaldehyde resin is formed in a ratio of urea to formaldehyde of between about 1 to 2 and 1 to 1.

* * * * *

UNITED STATES PATENT AND TRADEMARK OFFICE
CERTIFICATE OF CORRECTION

PATENT NO. : 4,032,515
DATED : June 28, 1977
INVENTOR(S) : Elizabeth A. Blommers and Roy H. Moult It is certified that error appears in the above-identified patent and that said Letters Patent are hereby corrected as shown below:

Column 6, line 14, --resin-- should be inserted after "liter";

Column 6, Table I, Adhesive Example No. 2, under Durability (psi-WF %), "532-91" should read --632-91--;

Column 11, Table II, under Strength (Psi-WF %), line 8, "7-100" should read --714-100--;

Column 12, line 34, "not" should read --now--;

Column 12, line 36, "90°" should read --98°--.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*